MULVEY & OHLEMACHER.
Car Brake.
No. { 2,206, 33,210. }
Patented Sept. 3, 1861.
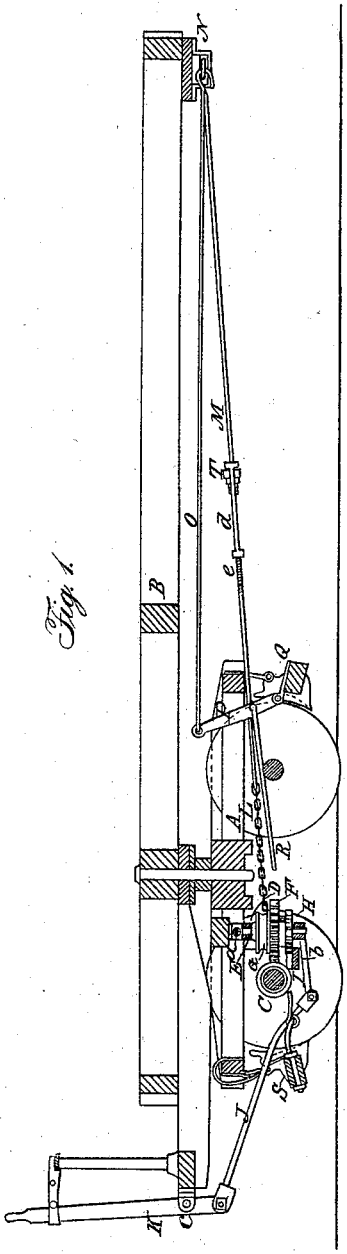
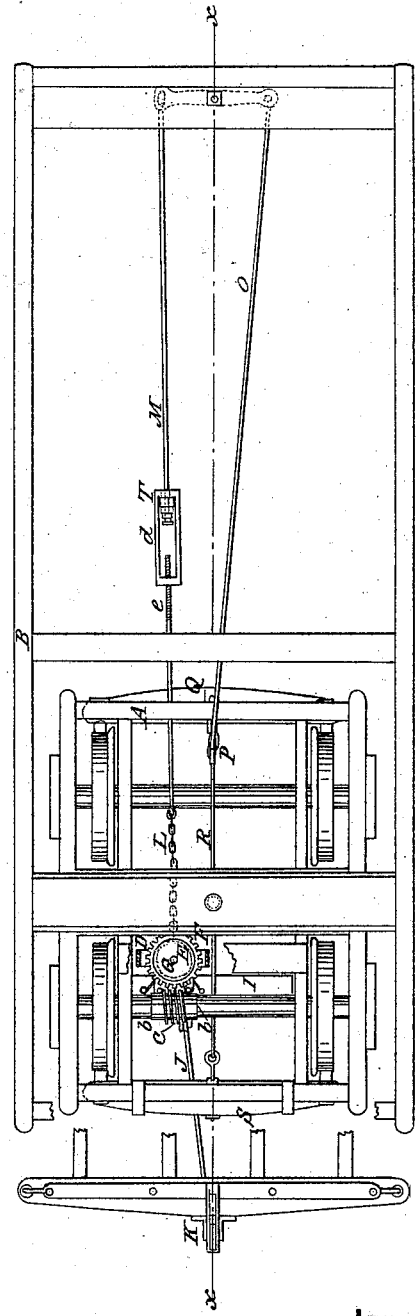
Witnesses:
Inventor:

UNITED STATES PATENT OFFICE.

JOSEPH MULVEY AND CHARLES OHLEMACHER, OF AURORA, ILLINOIS.

IMPROVEMENT IN RAILROAD-CAR BRAKES.

Specification forming part of Letters Patent No. 33,210, dated September 3, 1861.

*To all whom it may concern:*

Be it known that we, JOSEPH MULVEY and CHARLES OHLEMACHER, of Aurora, in the county of Kane and State of Illinois, have invented a new and Improved Railroad - Car Brake; and we do hereby declare that the following is a full, clear, and exact description of the same, reference being had to the annexed drawings, making a part of this specification, in which—

Figure 1 is a side sectional view of our invention, taken in the line $x\ x$, Fig. 2; and Fig. 2, a plan or top view of the same.

Similar letters of reference indicate corresponding parts in the two figures.

This invention relates to that class of car-brakes in which the power is applied to the brakes through the medium of the axles of the cars; and it consists in the employment or use of a swinging frame provided with a worm-wheel, ratchet, and pulley in connection with a screw on the axle, pawls, and rods, and levers, all arranged for joint operation, as hereinafter fully shown and described.

To enable those skilled in the art to fully understand and construct our invention, we will proceed to describe it.

A represents a car-truck, and B the bed of a car, to which the truck is attached. The truck and bed may be constructed in the ordinary way, and therefore do not require a minute description. One of the axles of the car-truck is provided with a screw C.

D is a swinging frame, which is suspended to the truck A, directly back of the axle, which is provided with the screw. The frame D is allowed to work freely on its points of suspension $a$, and in said frame a small shaft E is placed, said shaft having a worm-wheel F on it, a pulley G, and also a ratchet H, all of which are shown in Fig. 1.

I is a metal bar, which is secured transversely to the under side of the truck A, and has two pawls $b\ b$ attached.

To the lower end of the frame D there is attached a rod J, which extends forward and is connected to the lower end of a lever K, said lever being secured by a fulcrum-pin $c$ to the end of the platform of the car-bed, as shown clearly in Fig. 1.

To the pulley G there is attached a short chain L, and this chain is connected to a rod M, which extends along underneath the car-bed B, and is attached to one end of a lever N. The opposite end of this lever N has a rod O secured to it, said rod extending underneath the car-bed and having its front end attached to a lever P, one end of which is secured to the center of the inner shoe-bar Q. The lever P has a rod R attached to its center, and this rod R is connected to the center of the front shoe-bar S. This arrangement of the shoe-bars and rods is precisely the same as those of the ordinary hand-brakes in use.

The rod M is composed of two parts connected by a swivel-link $d$ and a screw $e$. One part of the rod M has a coil-spring T fitted in it, said spring being within the link $d$, as shown clearly in both figures.

From the above description it will be seen that the brakeman by drawing inward the upper end of lever K will bring the worm-wheel F in frame D in gear with the screw C on the outer axle of the truck A, and the shaft E in frame D will consequently be rotated, the chain L wound on the pulley G, and the brakes applied to the wheels. To relieve the wheels of the brakes, all that is required is for the brakeman to release the lever K, and the frame D will assume a vertical position and the worm-wheel F be disengaged from the screw C.

The spring T admits of a uniform pressure of the shoes on the wheels, and insures a gradual application of the power in consequence of the shoes being allowed a certain yielding movement while under pressure.

The ratchet H, when the worm-wheel F is in gear with the screw C, and also when a trifle out of gear with it, has the pawls $b$ engaged with it, in order to keep the brakes applied. The ratchet H is what may be termed a "double" one—that is to say, provided with reverse teeth at opposite sides—in order to suit both movements of the wheels, according to the direction in which the car is moving, one pawl only being in use at one time.

Having thus described our invention, what we claim as new, and desire to secure by Letters Patent, is—

1. The swinging frame D, connected with the hand-lever K and provided with the worm-wheel F, ratchet H, and pulley G, with the chain L of brake-rod M attached, in connection with the screw C on one of the axles of the truck and the pawls *b b* attached to bar I, all arranged as and for the purpose set forth.

2. The spring T, applied to the brake-rod M and arranged substantially as and for the purpose set forth.

JOSEPH MULVEY.
CHARLES OHLEMACHER.

Witnesses:
SELDEN A. EMERSON,
CHESTER F. ALLEN.